UNITED STATES PATENT OFFICE.

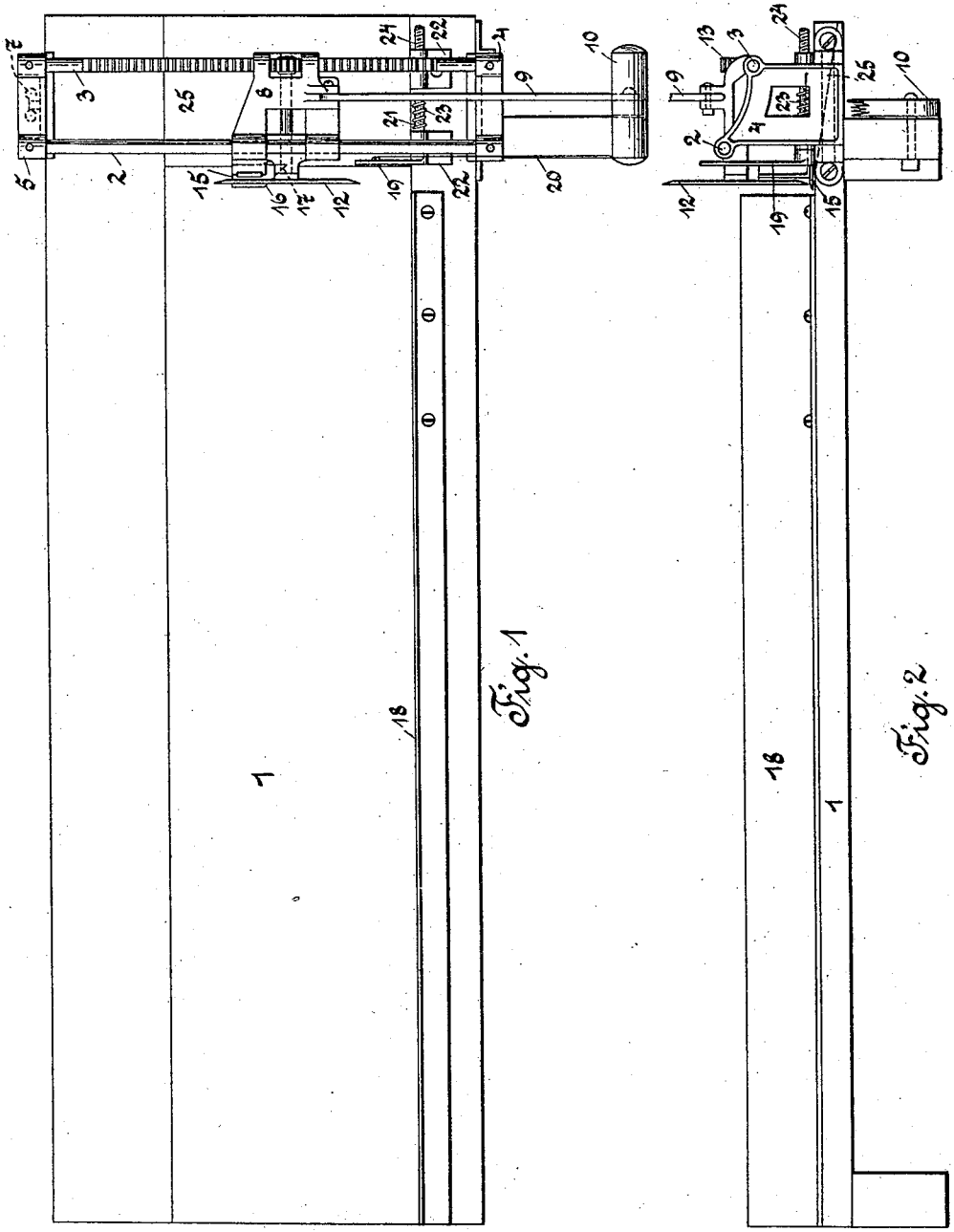

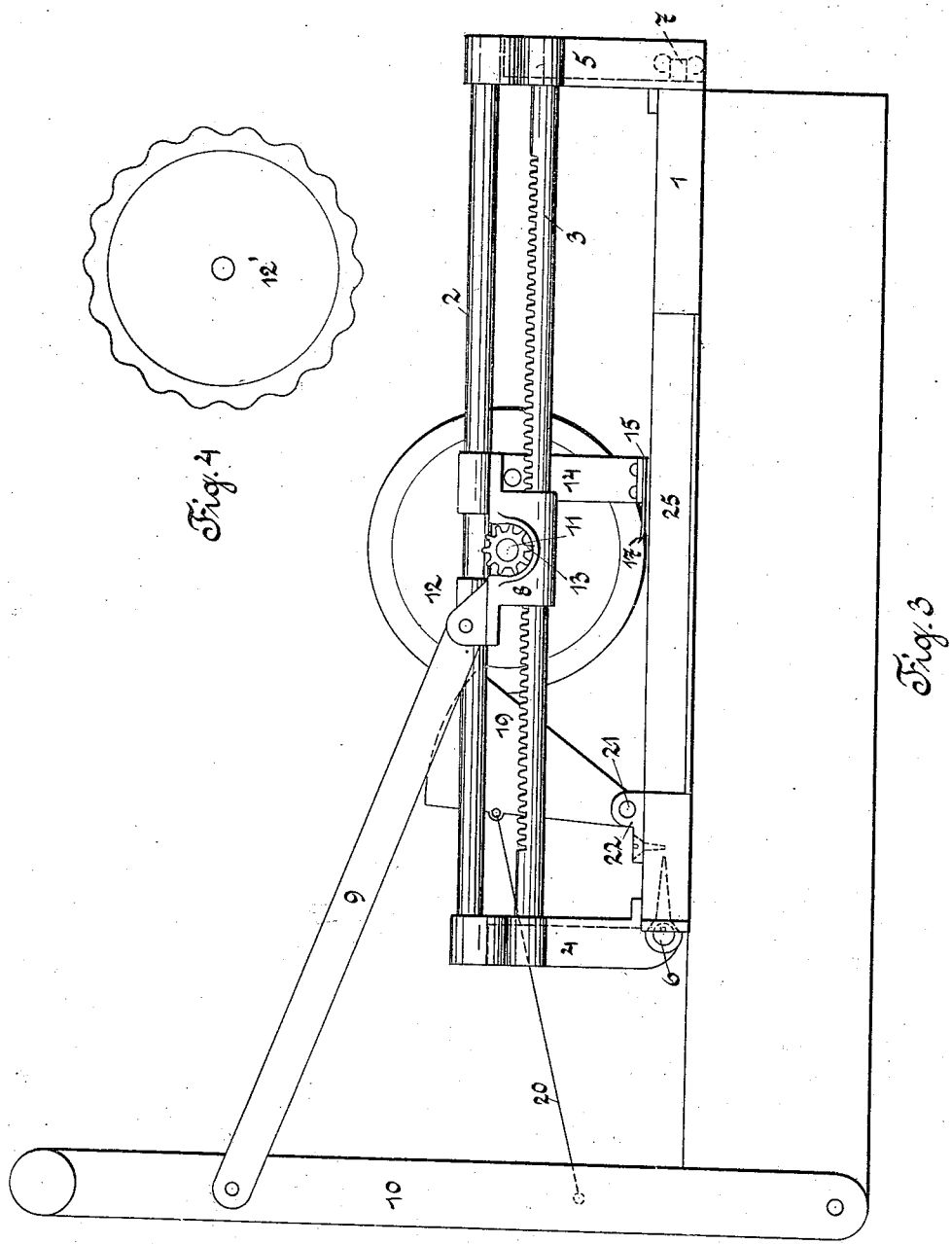

CARL F. NAYER AND ALBERT J. PERKINS, OF CHICAGO, ILLINOIS.

BACON-SLICER.

968,590.  Specification of Letters Patent.  Patented Aug. 30, 1910.

Application filed December 1, 1909. Serial No. 530,843.

*To all whom it may concern:*

Be it known that we, CARL F. NAYER and ALBERT J. PERKINS, citizens of the United States, residing at Chicago, county of Cook, and State of Illinois, have invented certain new and useful Improvements in Bacon-Slicers, of which the following is a specification.

Our invention relates to improvements in slicers and has for its object the production of a meat slicer especially adapted to the slicing of bacon and of simple construction and efficient in operation.

The invention consists in the combination and arrangements of parts hereinafter described and claimed.

Our invention will be best understood by reference to the accompanying drawings forming a part of this specification, and in which, Figure 1 is a top plan view of a meat slicer embodying our invention, Fig. 2, a side elevation of Fig. 1, Fig. 3, an enlarged end elevation of the slicer, and Fig. 4, an elevation of a modified form of slicing blade.

The preferred form of construction as illustrated in the drawings comprises a suitable table 1 upon which the bacon rests during the slicing thereof. At its forward end table 1 carries a guide rod 2 and a rack bar 3 mounted in suitable brackets 4 and 5. Bracket 4 is pivoted to the edge of said table at 6 and bracket 5 is removably connected with said table by means of a set screw 7 as shown. By this construction it will be seen that the guide rod and rack bar may be swung upwardly from table 1 so as to give access thereto for cleaning or other purposes.

A cross head 8 is slidably mounted on guide rod 2 and rack bar 3 and is connected by means of a link 9 with a hand lever 10 by means of which said cross head may be reciprocated on said guide rod and rack bar.

A shaft 11 is rotatably mounted in cross head 8 and carries a disk slicing blade 12 at its lower end. At its other end shaft 11 carries a spur gear 13 meshing with rack bar 3. By this construction it will be seen that upon reciprocation of cross head 8 the slicing blade 12 will be rotated in such manner that its lower edge will travel in a direction opposite to the direction of travel of cross head 8.

Cross head 8 carries a downwardly extending hanger 14 to the lower edge of which is secured a knife 15. The knife 15 is provided with a beveled cutting edge 16 crossing the line of cut of blade 12 and said knife is positioned to travel slightly above the plane of the cutting edge of disk 12 and the top or bearing surface of table 1. The forward end or nose 17 of knife 15 is turned upwardly as shown to facilitate the passage of said knife over the bacon rind. By this construction it will be seen that as blade 12 and knife 15 are drawn to the left in Fig. 3 the direction of travel of the cutting edge of blade 12 will be opposed to that of the knife 15 each of which thus tends to counteract the effect of the other thus relieving cutting pressure from the bacon. By extending the cutting edge of blade 12 slightly below that of knife 15 the effect of blade 12 upon the bacon will be to hold the rind flat against the top of table 1 without severing it and thus facilitate the action of knife 15 in severing the slices from the bacon rind.

A longitudinal guide 18 is secured to the side of table 1 to serve as a guide for a piece of bacon being fed to said blade and knife.

A stop blade 19 is connected by means of a cord 20 with lever 10 and is secured to a shaft 21 rotatably mounted in suitable brackets 22 on the top of table 1. Shaft 21 carries a helical spring 23 arranged to normally hold blade 19 in contact with the top of table 1 and in position to serve as a stop for the end of a piece of bacon being fed to the knives along guide 18. The outer end of shaft 21 is threaded so as to permit of longitudinal adjustments of blade 19 and thus regulation of the thickness of the slices severed by the knives. The front portion of table 1 is beveled as at 25 to facilitate passage of bacon slices from the knife.

In Fig. 4 we have illustrated a modified form of disk blade 12' having a scalloped cutting edge as shown and which may be used in place of blade 12.

While we have illustrated and described the preferred form of construction for carrying our invention into effect this is capable of variation and modification without departing from the spirit of our invention. We therefore do not wish to be limited to the exact details of construction set forth but desire to avail ourselves of such variations and modifications as come within the scope of the appended claims.

Having described our invention what we claim as new and desire to secure by Letters Patent is:

1. A device of the class described comprising a suitable table; a rotary slicing blade mounted to reciprocate on said table; means for reciprocating said blade; means for rotating said blade; a knife mounted to reciprocate with said rotary blade and adapted to cut off a slice from the bacon rind; and means for regulating the thickness of the slices; substantially as described.

2. A device of the class described comprising a suitable table; a rotary slicing blade mounted to reciprocate on said table; a rack bar; a gear carried by said blade and meshing with said rack bar; a knife mounted to reciprocate with said rotary blade and adapted to cut off a slice from the bacon rind; and means for regulating the thickness of the slices, substantially as described.

3. A device of the class described comprising a suitable table; a guide rod and rack bar mounted transversely of said table; a cross head mounted to reciprocate on said guide rod and rack bar; a shaft rotatably mounted in said cross head; a disk slicing blade mounted on said shaft; a gear on said shaft meshing with said rack bar; a knife carried by said cross head and having a cutting edge passing just above the bearing surface of said table and crossing the line of cut of said disk blade; and a lever connected to reciprocate said cross head, substantially as described.

4. A device of the class described comprising a suitable table; a guide rod and rack bar mounted transversely of said table; a cross head mounted to reciprocate on said guide rod and rack bar; a shaft rotatably mounted in said cross head; a disk slicing blade mounted on said shaft; a gear on said shaft and meshing with said rack bar; a knife carried by said cross head and having a turned-up nose and a cutting edge passing just above the bearing surface of said table and crossing the line of cut of said disk blade; and a lever connected to reciprocate said cross head, substantially as described.

5. A device of the class described comprising a suitable table; a guide rod and rack bar mounted transversely of said table; a cross head mounted to reciprocate on said guide rod and rack bar; a shaft rotatably mounted in said cross head; a disk slicing blade mounted on said shaft; a gear on said shaft and meshing with said rack bar; a longitudinal guide for a piece of bacon fed to said blade; a stop for said piece of bacon adjustably mounted beyond said blade and pivoted to swing to and away from said operative position; and a lever connected to reciprocate said cross head and swing said stop to and away from operative position, substantially as described.

6. A device of the class described comprising a suitable table; a guide rod and rack bar mounted transversely of said table; a cross head mounted to reciprocate on said guide rod and rack bar; a shaft rotatably mounted in said cross head; a disk slicing blade mounted on said shaft; a gear on said shaft and meshing with said rack bar; a knife carried by said cross head and having a cutting edge passing just above the bearing surface of said table and crossing the line of cut of said disk; a longitudinal guide for a piece of bacon fed to said blade; a stop for said piece of bacon adjustably mounted beyond said blade and pivoted to swing to and away from said operative position; and a lever connected to reciprocate said cross head and swing said stop to and away from operative position, substantially as described.

7. A device of the class described comprising a suitable table; a guide rod and rack bar mounted transversely of said table; a cross head mounted to reciprocate on said guide rod and rack bar; a shaft rotatably mounted in said cross head; a disk slicing blade mounted on said shaft; a gear on said shaft and meshing with said rack bar; a knife carried by said cross head and having a turned-up nose and a cutting edge passing just above the bearing surface of said table and crossing the line of cut of said disk blade; a longitudinal guide for a piece of bacon fed to said blade; a stop for said piece of bacon adjustably mounted beyond said blade and pivoted to swing to and away from said operative position and a lever connected to reciprocate said cross head and swing said stop to and away from said operative position, substantially as described.

8. A device of the class described comprising a suitable table; a guide rod and rack bar mounted transversely of said table and pivoted at one end to swing upwardly from said table; a cross head mounted to reciprocate on said guide rod and rack bar; a shaft rotatably mounted in said cross head; a disk slicing blade mounted on said shaft; a gear on said shaft and meshing with said rack bar; a knife carried by said cross head and having a turned-up nose and a cutting edge passing just above the bearing surface of said table and crossing the line of cut of said disk blade; a longitudinal guide for a piece of bacon fed to said blade; a stop for said piece of bacon adjustably mounted beyond said blade and pivoted to swing to and away from said operative position; and a lever connected to reciprocate said cross head and swing said stop to and away from operative position, substantially as described.

In testimony whereof we have signed our names to this specification in the presence of two subscribing witnesses.

CARL F. NAYER.
ALBERT J. PERKINS.

Witnesses:
W. C. SMITH,
B. G. RICHARDS.